Patented Apr. 22, 1941

2,239,534

UNITED STATES PATENT OFFICE 2,239,534

POLYMERIZATION AND CONDENSATION PRODUCTS

Louis A. Mikeska, Westfield, N. J., and Eugene Lieber, West New Brighton, Staten Island, N. Y., assignors to Standard Oil Development Company, a corporation of Delaware No Drawing. Application September 2, 1939, Serial No. 293,304

16 Claims. (Cl. 260—608)

This invention relates to improved polymerization and condensation products of phenol sulfides which are suitable for use as oxidation inhibitors in mineral oil compositions, particularly to improve the stability of mineral oils when exposed to elevated temperatures such as when they are used as lubricants in internal combustion engines.

In a copending application Serial No. 51,827, filed November 27, 1935, by Louis A. Mikeska and Charles A. Cohen (now Patent No. 2,139,766), there is described the use of certain substituted aryl thioethers as stabilizing agents for mineral oils. In a second copending application Serial No. 93,764, filed August 1, 1936, by the present inventors, there is described the use of a class of substituted aryl polysulfides for the same purpose. It has also been discovered that higher reaction products which are soluble in hydrocarbon oils, particularly the dimers and trimers of these two classes of organic sulfur compounds, may be prepared and that they also possess many desirable characteristics particularly as mineral oil stabilizing agents. This application is filed in order to present claims to such products and their preparation. It is a continuation-in-part of our copending application Serial No. 97,197, filed August 21, 1936, now Pat. No. 2,198,828 which contains claims to lubricating compositions containing the compounds described herein.

The compounds of the present invention are represented by the following formula:

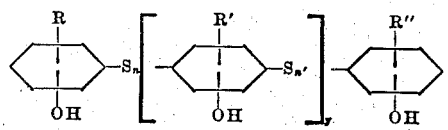

where R is an alkyl group containing at least 4 carbon atoms. Compounds containing 2 alkyl phenol groups in which the alkyl radicals contain at least 4 carbon atoms are preferred. The alkyl groups may be normal, iso, secondary or tertiary. They may also be cyclo aliphatic, but the open chain groups are preferred. R' and R'' are preferably the same as R, but may also be any other alkyl groups and hydrogen atoms in different groups of the same molecule, particularly when $y$ is greater than 1. The polymers may thus be either symmetrical or unsymmetrical, i. e., containing different alkyl and/or aryl radicals in each organic group linked to the remainder of the molecule by sulfur atoms. The aryl radicals may contain more than one hydroxyl substituent, including such groups as those derived from resorcinol, hydroquinone and their alkylated and arylated derivatives. Y is an integer from 1 to 6 and is preferably 2 or 4; $n$ and $n'$ represent integers from 1 to 4 and are preferably 1 or 2, and $n'$ may represent different integers in different groups of the same molecule when $y$ is greater than 1. The linkage between the aromatic nuclei is preferably through the sulfur atoms. The benzene ring also represents linked aromatic rings such as diphenyl and condensed aromatic rings such as naphthyl.

The compounds of this invention also include derivatives of the alkyl phenol sulfides which contain other substituent groups in addition to the hydroxy and alkyl groups. Such additional substituent groups should not, however, offset the solubilizing effect of the alkyl groups to an extent sufficient to render the compound insoluble in lubricating oils. Examples of suitable groups or radicals, which may be attached to either the aryl or the alkyl group, are alkyl and aryl hydrocarbon radicals, also such radicals containing oxygen in the form of ether, aldehyde, ketone, acid or ester groups, those containing nitrogen in the form of amine or nitrile groups and those containing sulfur, selenium, tellurium and the like.

The sulfur atoms linking the organic groups of the alkyl phenol sulfides may be wholly or partly replaced by the heavier non-metallic elements of group 6 of the periodic table, such as selenium and tellurium.

Preferred examples of this class of compounds are indicated by the following formulae, together with suitable methods for the preparation of these classes of compounds. In each of these formulae, R represents an alkyl radical having at least 4, and preferably from 4 to 8 carbon atoms.

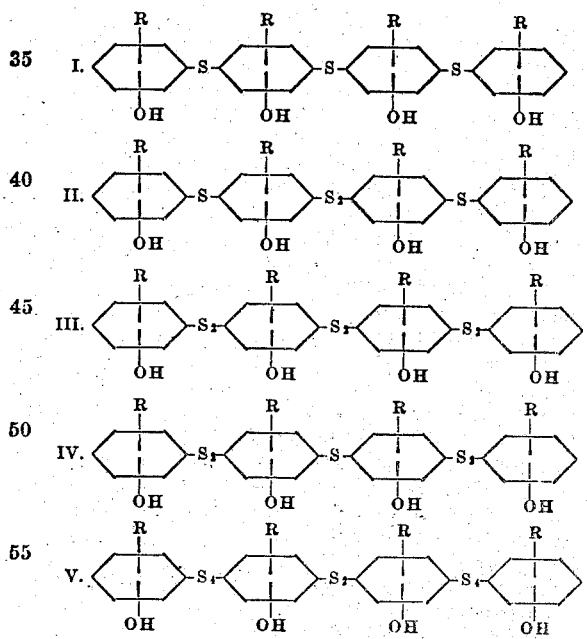

The above formulae are diagrammatic and the hydroxyl and alkyl radicals are not limited to the positions shown therein. Each of these radicals may be connected to any position in the benzene ring, but those compounds in which the alkyl radicals are in ortho or para position to the hydroxyl group are preferred.

While these compounds may be added in any desired concentration within their solubility limits to lubricating oils, they are preferably used in concentrations of about 0.1 to 2.0% and a concentration of about 0.5% will be found sufficient to stabilize the majority of petroleum lubricating oils. Larger proportions, that is up to about 5% or more, may be used to improve the lubricating properties of the oil. These compounds may be prepared by various methods.

One method for preparing a compound of Class I is to bring the corresponding alkyl phenol into reaction with sulfur dichloride in a mol ratio of sulfur dichloride to phenol between about 1 and 1.5, preferably from about 1.2 to 1.4. In this way, both the alkyl phenol sulfide and polymers thereof are formed. The alkyl phenol sulfide is separated from the polymers in the reaction product by vacuum distillation; the polymers being obtained as a residue. For example, the dimers and trimers of butyl phenol thioether may be prepared by reacting butyl phenol with sulfur dichloride. The reaction is preferably conducted in the presence of an inert solvent, preferably an alkyl halide such as ethylene chloride, at a temperature of about 60 to 140° C., preferably about 80 to 110° C. The solvent preferably boils at the reaction temperature and the reaction is conducted under reflux until the hydrogen chloride formed thereby is completely eliminated. This process is described in the copending application Serial No. 93,764 of Mikeska and Lieber, referred to above. A polymer product of superior quality is obtained by bringing the sulfur dichloride slowly into contact with the phenol solution at a temperature of about 30 to 40° C., maintaining this temperature by cooling until all reagents have been added, then heating the mixture to the boiling point of the solvent and refluxing it for about two hours. In this manner the possibility of reversion of the sulfur dichloride to sulfur monochloride is avoided and the polymer product, in concentrated form, is less corrosive to copper in the copper strip test.

A second and preferred method for preparing polymers of this type is to bring a dialkyl diphenol sulfide into reaction with sulfur dichloride, using about 2 mols of the former per mol of sulfur dichloride. For example, the dimers of tertiary amyl phenol thioether may be prepared by bringing the tertiary amyl phenol thioether into reaction with sulfur dichloride in the manner described. This reaction may be conducted in the same solvents and with the same operating conditions described above. In this way a substantially theoretical yield of the dimer is obtained without the formation of undesirable and insoluble highly polymerized products.

Compounds of Class II may be prepared by bringing a dialkyl diphenol sulfide into reaction with sulfur monochloride in the same solvents and under the same operating conditions described above, using preferably about 2 mols of the former per mol of sulfur monochloride. For example, the dimer and trimer having disulfide linkages between the monomer portions of their molecules may be prepared by bringing a butyl phenol thioether into reaction with sulfur monochloride in the manner described.

Compounds of Class III may be prepared by bringing an alkyl phenol into reaction with a slight excess of sulfur monochloride, using between about 0.5 and 0.75, preferably between 0.6 and 0.7, mols of sulfur monochloride per mol of the alkyl phenol. By this means both the alkyl phenol disulfide and polymers thereof are formed. The polymers may be separated from the monomer by extraction with selective solvents, or by other suitable means. Such polymers may also be prepared by bringing a dialkyl diphenol disulfide into reaction with sulfur monochloride, using about 2 mols of the former per mol of sulfur monochloride. These reactions may be conducted in the same solvents and under the same operating conditions described above. For example, the dimer and trimer of ditertiary amyl diphenol disulfide, in which the monomer portions of their molecules are linked by a disulfide group, may be prepared by bringing ditertiary amyl diphenol disulfide into reaction with sulfur monochloride in the manner described.

Compounds of Class IV may be prepared by bringing a dialkyl diphenol disulfide into reaction with sulfur dichloride in the same solvents and under the same operating conditions described above, using preferably about 2 mols of the dialkyl diphenol disulfide per mol of sulfur dichloride. For example, the dimer of dibutyl diphenol disulfide, in which the monomer portions of its molecules are connected by thioether linkages, may be prepared by bringing dibutyl diphenol disulfide into reaction with sulfur dichloride in the manner described.

Compounds of Class V may be prepared by bringing a dialkyl diphenol tetrasulfide into reaction with sulfur monochloride, using preferably about 2 mols of tetrasulfide per mol of sulfur monochloride. For example, the dimer of diamyl diphenol tetrasulfide in which the monomer portions of its molecules are joined by disulfide linkages, may be prepared by bringing the diamyl diphenol tetrasulfide into reaction with sulfur monochloride in the manner described.

All of the above preparations may be conducted in the solvents and under the operating conditions described in connection with the preparation of compounds of Class I.

Higher polymers may be obtained by using slightly higher ratios of the sulfur chloride reagent to the phenol or by bringing any of the polymers above described into further reaction with sulfur dichloride or sulfur monochloride under the same conditions already described.

The following example is presented to illustrate one process for preparing the compounds of this invention.

Example 1

125 grams of ditertiary amyl diphenol sulfide (2 molar proportions) were dissolved in 500 cc. of ethylene chloride and the solution was heated to boiling under reflux. 18 grams (one molar proportion) of sulfur dichloride were dissolved in 100 cc. of ethylene chloride. This solution was added with stirring to the boiling solution of the amyl phenol sulfide. The hydrogen chloride gas evolved during the reaction was withdrawn from the reaction zone through the reflux condenser. When the addition of the sulfur dichloride solution was completed, the refluxing of the reaction mixture was continued for six hours when no further evolution of hydrogen chloride took place. By this means, all hydrogen chloride is removed and there is no need to wash the reaction product with water. The time of refluxing can be cut down by blowing an inert gas such as nitrogen or flue gas through the reaction mixture.

The solvent, ethylene chloride, was then removed from the reaction mixture by distillation and the product was then distilled under vacuum. The head temperature in the vacuum still was carried to 250° C. at 3 mm. of mercury pressure absolute. The distillation residue consisted of 134 grams of ditertiary amyl diphenol sulfide dimer. The yield of diamyl diphenol sulfide dimer recovered as residue was 100%, based on the amount of diamyl diphenol sulfide charged.

It was a dark red, translucent, viscous liquid which was soluble in ether, alcohol, acetone, carbon disulfide, liquid hydrocarbons, hydrocarbon halides, petroleum oils and fractions thereof, including gasoline, kerosene, burning and Diesel oils and lubricating oils, and in many other organic solvents.

The compounds described above may be used as oxidation inhibitors and improving agents in similar concentrations in other hydrocarbons and hydrocarbon compositions such as waxes, lubricating oils, greases, asphalts, fuel oils, Diesel oils, naphthas, burning oil, gasoline, and the like.

These compounds may also be used as oxidation inhibitors generally in organic materials which are subject to degradation by oxidation during normal conditions of storage or use, or which tend to deteriorate by absorption of oxygen from the air. Examples of such materials are: fatty oils and waxes, petroleum oils and their derivatives, soaps, aldehydes, synthetic resins, rubber, synthetic rubber, paper and the like. Thus, these compounds can be used to protect waxes from becoming rancid, especially the waxes of the type used to line food and beverage containers.

The compounds of this invention greatly stabilize mineral lubricating oils at elevated temperatures, especially the highly refined oils such as synthetic oils, solvent extracted oils obtained by treatment of mineral lubricating oils with single solvents such as phenol, dichlorethyl ether, furfural, propane, nitrobenzene, crotonaldehyde, etc., or by double or multiple solvents such as propane-cresol, etc., clay or acid treated oils, also aluminum chloride treated oils, white oils, hydrogenated oils, and the like. These compounds are especially effective with such oils having viscosity indices above 60 to 80. Lubricating oils which also may be stabilized by these compounds are mineral oils of over 35 or 40 Saybolt viscosity at 210° F., and even those having a viscosity of over 100 seconds at 100° F., which are either in the crude form or have been partially or highly refined by distillation, voltolization, chemical reagents, or adsorptive agents, as well as coal tar or shale distillates, pale oils, neutrals, bright stocks and other residual stocks, cracking coil tar fractions, condensed or polymerized fractions, and the like, which may be either waxy, dewaxed, or non-waxy.

The lubricants to which these stabilizing agents are added may also contain dyes, metallic or other soaps, pour inhibitors, sludge dispersers, oxidation inhibitors, thickeners, V. I. improvers such as soluble linear polymers, oiliness agents, resins, rubber, fatty oils, heat thickened fatty oils, sulfurized fatty oils, extreme pressure lubricating agents, organo-metallic compounds, bright stocks such as refined petroleum lubricating oil residues, voltolized fatty oils, mineral oils or waxes, colloidal solids such as graphite, zinc oxide, etc., and the like.

The hydroxyl groups of the alkyl phenol sulfide polymers may be partially or completely esterified with organic acids, preferably fatty acids. The resulting esterified compounds are particularly effective as oiliness agents in lubricating oils. These esterified compounds may be mixed and used with non-esterified alkyl phenol sulfide polymers. These oiliness agents may be used in any suitable concentration. The amount used is usually between 0.1 and 5.0% of the total composition, and 0.5 to 2.0% is generally sufficient.

The following examples illustrate the use of the compounds described herein as stabilizing agents in lubricating oils.

*Example 2*

0.2% of the dimer of ditertiary amyl diphenol sulfide, a Class I compound, was blended with an S. A. E. 20 lubricating oil derived from petroleum. A blend of the same concentration of ditertiary amyl diphenol sulfide was also prepared with a sample of the same oil. Corrosive action, Sligh numbers and cone numbers were determined for the original oil and the blends, with the following results.

|  | Original oil | Blends | |
|---|---|---|---|
|  |  | Diamyl diphenol sulfide | Polymer |
| Corrosion | Passes | Passes | Passes |
| Sligh No. | 23.8 | 21.4 | 0.8 |
| Cone No. | 0.45 | 0.14 | 0.11 |

It will be noted that the polymer reduced not only the cone number even more than did the diamyl diphenol sulfide, but it also reduced the Sligh number to such an extent that sludge formation was almost inappreciable, while the diamyl diphenol sulfide had very little effect on the Sligh number.

A description of the methods of testing used in the above example are as follows:

*Corrosion test.*—This consists in immersing a bright copper strip for three hours in the oil maintained at 212° F. It is used to determine the presence of "corrosive" sulfur in oil, which is indicated by discoloration or pitting of the copper strip.

*Sligh test.*—The tendency of an oil to sludge under oxidizing conditions is described in Proc. A. S. T. M. 24, 964, II (1924); in our modification of this test, the oxidation is continued for 24 hours.

*Cone test.*—This test is a means for determining the tendency of an oil to deposit solid matter upon heated metallic surfaces. It consists in slowly dropping the oil to be tested onto a heated metal (generally steel) cone, having a circumferential groove milled out in a screw fashion on the periphery so as to allow a time of contact of about one minute between the heated steel surface and the oil. A total volume of 60 cc. of oil is dropped from a dropping funnel onto the cone over a period of 2 hours. The temperature of the cone may be any desired value, but for lubricating oils 250° C. is preferable since it approximately represents the extreme temperature to which oils are exposed in ordinary engine use. The cone is weighed before the test. After all of the oil is run over the metal surface, the cone is washed with naphtha to remove adhering oil and is then weighed, the weight of the solid deposit being equal to the difference in weight of the cone before and after the test. This value is generally reported in grams.

*Example 3*

Runs were made in a C. F. R. (Cooperative Fuel Research) engine under closely comparable conditions using a highly refined petroleum lubricating oil of 72 seconds Saybolt viscosity at 210° F. and blends of 0.2% of ditertiary amyl diphenol sulfide (A) and of the dimer thereof (B), prepared as in Example 1, in separate portions of the same oil. After each run the engine was taken down, inspected and rated by demerits according to the condition of the piston parts, valves and cylinder. On this scale, the demerit rating is higher as the engine condition is worse. The runs were each made for 14 hours at a jacket temperature of 375° F. The results are given below:

|  | C. F. R. engine tests | | |
| --- | --- | --- | --- |
|  | Blank | Blends | |
|  |  | A | B |
| Demerit rating | 5.2 | 2.3 | 1.9 |

Polymers of other alkyl phenol sulfides may also be prepared from the corresponding alkyl phenols or the corresponding alkyl phenol sulfides and used in the manner described in the above example.

This invention is not to be limited to any specific examples, all of which have been presented solely for the purpose of illustration, but is to be limited only by the following claims, in which it is desired to claim all novelty insofar as the prior art permits.

We claim:

1. Polymerization and condensation products of phenol sulfides, having the following formula:

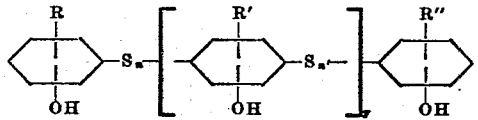

where R is an alkyl group of at least 4 carbon atoms, R' and R'' are selected from the class consisting of alkyl groups and hydrogen, $n$ and $n'$ are integers from 1 to 4 and $y$ is an integer from 1 to 6.

2. Polymerization and condensation products of alkyl phenol sulfides, having the following formula:

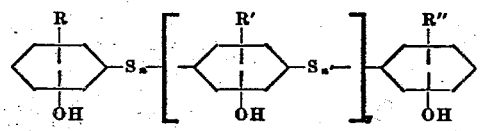

where R, R' and R'' are alkyl groups of 4 to 8 carbon atoms each, $n$ and $n'$ are integers from 1 to 2, and $y$ is an integer from 2 to 4.

3. Polymerization and condensation products of alkyl phenol sulfides having the following formula:

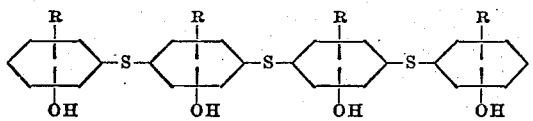

where R represents alkyl groups of 4 to 8 carbon atoms.

4. Polymerization and condensation products of alkyl phenol sulfides having the following formula:

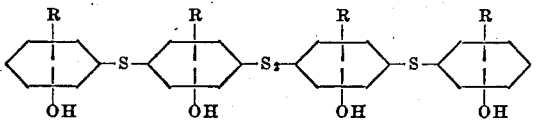

where R represents alkyl groups of 4 to 8 carbon atoms.

5. Polymerization and condensation products of alkyl phenol sulfides having the following formula:

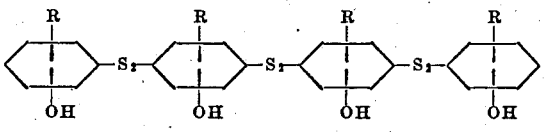

where R represents alkyl groups of 4 to 8 carbon atoms.

6. The dimer of a dialkyl diphenol thioether, having a sulfur linkage between the monomeric portions of its molecule.

7. The dimer of a dialkyl diphenol disulfide, having a sulfur linkage between the monomeric portions of its molecule.

8. The dimer of ditertiary amyl diphenol thioether, having a sulfur linkage between the monomeric portions of its molecule.

9. The dimer of ditertiary amyl diphenol disulfide, having a sulfur linkage between the monomeric portions of its molecule.

10. A polymer of a dialkyl diphenol sulfide, prepared by condensation of said dialkyl diphenol sulfide with a sulfur chloride, said alkyl groups having from 4 to 8 carbon atoms each and said polymer being a viscous liquid which is soluble in hydrocarbon oils and which is unvaporized at 250° C. at a pressure of 3 mm. of mercury.

11. A polymer according to claim 10 in which said polymer is a product of the condensation of ditertiary amyl diphenol thioether and sulfur dichloride.

12. Process for preparing polymers of alkyl phenol sulfides comprising bringing an alkyl phenol sulfide having at least 4 carbon atoms in the alkyl group into reaction with a sulfur halide.

13. Process according to claim 12 in which said alkyl group has from 4 to 8 carbon atoms.

14. Process according to claim 12 in which said alkyl phenol sulfide is a thioether.

15. Process according to claim 12 in which said alkyl phenol sulfide is a disulfide.

16. Process according to claim 12 in which said sulfur halide is sulfur monochloride.

LOUIS A. MIKESKA.
EUGENE LIEBER.